Patented Nov. 22, 1938

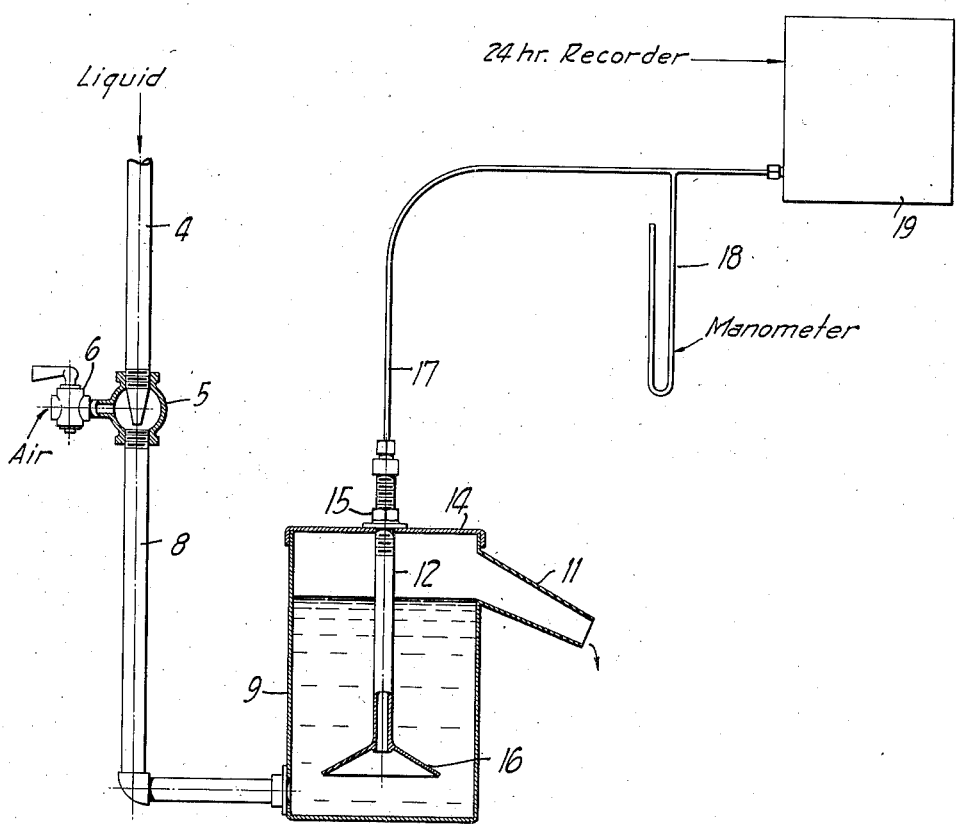

2,137,843

UNITED STATES PATENT OFFICE 2,137,843

APPARATUS FOR DETERMINING SPECIFIC GRAVITY

John J. Jennings, Bakersfield, Calif.

Application June 22, 1937, Serial No. 149,658

3 Claims. (Cl. 265—44)

This invention relates to an apparatus for determining the specific gravity of a material.

In many industrial operations it is highly desirable that an operator be constantly advised as to specific gravity of a liquid. Thus, it is now common practice, in the drilling of oil wells, to use a mud and to vary the specific gravity of this as conditions change during the drilling operation. It is important that the operator be constantly advised as to the specific gravity of a mud, for this property is indicative of some controlling conditions affecting the drilling operation. For example, the presence of excess gas in the mud frequently indicates that the mud is too light and that more solid should be added to it to increase its density and increase the pressure upon gas in the well.

While the present invention is particularly applicable to the drilling of oil wells and to the handling of an oil well mud, it is capable of generic application, being broadly applicable to various uses.

It is generally the object of the present invention to provide an apparatus whereby continuous specific gravity of a liquid can be taken in an automatic manner.

Another object of the invention is to provide a simple and yet comparatively accurate apparatus for determining continuously and automatically the specific gravities of liquids.

In the drawing, I have indicated the apparatus useful in accordance with my invention. This showing is more or less diagrammatic. The form of the apparatus can vary, but that disclosed indicates broadly the elements involved in their simplest form.

In practicing the invention, I utilize the pressure exerted by a column of the liquid upon a lighter field. The column of the liquid is maintained at a predetermined height. The change in specific gravity is indicated by the change in pressure exerted upon the lighter fluid, this being measured upon a suitable instrument as a manometer or a continuous pressure recording device.

The invention will be further illustrated in connection with the operation of the apparatus described in the drawing. Liquid is delivered from line 4 to an aspirator indicated generally at 5, air being admitted under the control valve 6 into the aspirator. The mixed air-liquid stream is passed through line 8 and is released into a vessel indicated at 9. This vessel has an overflow spout 11, permitting ready egress of excess liquid in the vessel so that a substantially constant heighth of liquid is maintained in the vessel. The pressure of a predetermined column of the liquid in vessel 9 is utilized as the specific gravity determining means. In this case I have shown a threaded pipe 12 supported on cover 14 of the vessel by adjustable nut 15. The pipe 12 is open at its lower end and includes an attachment 16 in the form of a truncated cone attached at its apex. Pipe 12 is connected by a line 17 to a suitable pressure indicating device such as the manometer 18 or the pressure recording device 19.

In operation, the mixed air-liquid stream is released into vessel 9. The vessel 9 is of such a size that fluid flow does not exert pressure on the open end of pipe 12. The air is released, part of the air being collected by the funnel-like attachment 16. The importance of this will be brought out hereinafter.

The liquid and air readily separate, and the heighth of the column of liquid above the bottom of the attachment 16 exerts pressure on the air within pipe 12 and line 17. This pressure is indicated on the manometer 18 and the recording device 19.

The adjustable nut 15 enables the effective heighth of the column of liquid to be varied to care for variations in the specific gravity of various materials with which the apparatus can be used. For example, the specific gravity of the oil well mud can vary widely. Some muds are very heavy while others are lighter. Also, if it is desired to switch from one liquid to another, as from mud to gasoline, the nut 15 permits of a range of adjustment while the fluid utilized in the manometer 18 can be changed.

The attachment 16 maintains the pipe 12 and fluid line 17 always fully charged with air. Maintenance of a constant charge of air in line 17 renders the apparatus substantially independent of the ambient temperature. Thus, instead of a drop in temperature affecting the device, indicating a false increase in specific gravity, the total air supply contained in the pipe 12 and line 17 is maintained constant, being supplied with air released from the incoming stream. Instead of air, of course any other gas can be employed so long as it is not soluble to an extent whereat it alters the specific gravity of the liquid.

The manometer or pressure indicating device can be calibrated readily so its reading is indicative of specific gravity or other factors as pounds of solid per gallon, pounds per cubic foot etc. Since line 4 can be a bleed line on a main line a continuous indication of the specific gravity can be obtained. The pressure indicating device can include a suitable alarm device if the value measured reaches too high or too low a point.

I claim:

1. In an apparatus of the class described, a vessel providing a well for a liquid, a gas chamber therein open adjacent the bottom thereof to permit gas in said chamber to contact liquid in said well, means for maintaining a predetermined heighth of liquid column above said chamber opening, means for releasing gas into said vessel below the liquid level therein and below the opening in said gas chamber, said chamber collecting gas separating out of said liquid below said open chamber bottom, and means for measuring the gas pressure in said chamber.

2. An apparatus of the class described consisting of a vessel, an overflow from said vessel, air pressure measuring means, an air pipe, means supporting said pipe on said vessel with the open end thereof below said overflow, a truncated cone attached adjacent its apex to said open end of said pipe, means for delivering a mixed air and liquid stream to said vessel below said cone whereby said cone collects air delivered to said vessel, and means connecting the other pipe end to said pressure measuring means.

3. In an apparatus of the class described, a vessel providing a well for a liquid, a gas chamber therein open adjacent the bottom thereof to permit gas in said chamber to contact liquid in said well, means for maintaining a predetermined heighth of liquid column above said chamber opening, means for releasing a liquid stream laden with a gas substantially insoluble in and inert to said liquid into said vessel below the chamber opening whereby the gas is liberated and collected in the chamber to maintain said chamber gas filled, and means for measuring the gas pressure in said chamber.

JOHN J. JENNINGS.